(12) United States Patent
Bailly et al.

(10) Patent No.: US 10,747,877 B2
(45) Date of Patent: Aug. 18, 2020

(54) METHOD FOR PROTECTING AN ELECTRONIC DEVICE EXECUTING A PROGRAM AGAINST FAULT INJECTION AND TYPE CONFUSION ATTACKS

(71) Applicant: Idemia Identity & Security France, Issy-les-Moulineaux (FR)

(72) Inventors: Alexis Bailly, Issy-les-Moulineaux (FR); Houssem Maghrebi, Issy-les-Moulineaux (FR); Ahmadou Serre, Issy-les-Moulineaux (FR); Marc Brugnon, Issy-les-Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 226 days.

(21) Appl. No.: 15/818,593

(22) Filed: Nov. 20, 2017

(65) Prior Publication Data
US 2018/0144129 A1 May 24, 2018

(30) Foreign Application Priority Data
Nov. 21, 2016 (FR) .................................. 16 61310

(51) Int. Cl.
  *G06F 21/55* (2013.01)
  *G06F 11/07* (2006.01)
  (Continued)

(52) U.S. Cl.
  CPC .......... *G06F 21/554* (2013.01); *G06F 11/079* (2013.01); *G06F 11/0721* (2013.01);
  (Continued)

(58) Field of Classification Search
  CPC ............. G06F 11/0721; G06F 11/1629; G06F 11/079; G06F 21/52; G06F 21/53;
  (Continued)

(56) References Cited

U.S. PATENT DOCUMENTS

| 7,797,682 B2 * | 9/2010 | Stocker | G06F 9/45504 |
| | | | 714/28 |
| 2004/0146270 A1 * | 7/2004 | Proust | G06F 21/575 |
| | | | 386/240 |

(Continued)

FOREIGN PATENT DOCUMENTS

| EP | 1960934 A1 | 8/2008 |
| FR | 3006471 A1 | 12/2014 |

(Continued)

OTHER PUBLICATIONS

Dubreuil, Jean, et al. "Mitigating type confusion on java card." International Journal of Secure Software Engineering (IJSSE) 4.2 (2013): 19-39. (Year: 2013).*

(Continued)

*Primary Examiner* — Michael Simitoski
(74) *Attorney, Agent, or Firm* — Womble Bond Dickinson (US) LLP

(57) ABSTRACT

A method for protecting an electronic device executing a program against fault injection and type confusion attacks likely to affect a variable (Z) intended to be used by the program. The method includes calculating integrity check data (X, Y) of variable (Z), dependent on a type (T) of the variable (Z), and a value (V) of the variable (Z) stored in an execution stack (P1) and/or of a first addressing datum (A) stored in a first index register (ind1). The first addressing datum (A) adapted to locate the value (V) stored in the execution stack (storing the integrity check data (X, Y) on the variable (Z) in at least one control stack (P2, P3) different to the execution stack (P1). Storing in a second index register (ind2), a unique second addressing datum (A2) adapted to locate the integrity check data (X, Y) in the or each control stack (P2, P3).

17 Claims, 6 Drawing Sheets

(51) Int. Cl.
G06F 21/53 (2013.01)
G06F 21/57 (2013.01)

(52) U.S. Cl.
CPC .............. G06F 21/53 (2013.01); G06F 21/57 (2013.01); *G06F 2221/034* (2013.01)

(58) Field of Classification Search
CPC ........ G06F 21/57; G06F 21/554; G06F 21/64; G06F 21/755; G06F 21/77; G06F 9/30134; G06F 2221/034; H04L 9/003
See application file for complete search history.

(56) References Cited

U.S. PATENT DOCUMENTS

| | | | |
|---|---|---|---|
| 2004/0186979 A1* | 9/2004 | Janke | G06F 9/30189 712/1 |
| 2005/0097361 A1* | 5/2005 | Apostolopoulos | G06F 21/64 726/4 |
| 2005/0218234 A1* | 10/2005 | Girard | G06F 9/30178 235/492 |
| 2009/0165149 A1* | 6/2009 | Gonzalvo | G06F 21/52 726/34 |
| 2009/0187748 A1* | 7/2009 | Krig | G06F 9/3004 712/227 |
| 2013/0036340 A1* | 2/2013 | Kidney | G06F 11/1092 714/770 |
| 2013/0152053 A1* | 6/2013 | Cui | G06F 11/3672 717/127 |
| 2014/0169795 A1* | 6/2014 | Clough | G06F 19/3418 398/106 |

FOREIGN PATENT DOCUMENTS

| | | |
|---|---|---|
| FR | 3010814 A1 | 3/2015 |
| WO | 2007/068706 A1 | 6/2007 |

OTHER PUBLICATIONS

Dubreuil, Jean, et al. "Type classification against fault enabled mutant in java based smart card." 2012 Seventh International Conference on Availability, Reliability and Security. IEEE, 2012. (Year: 2012).*

Lackner, Michael, et al. "Countering type confusion and buffer overflow attacks on Java smart cards by data type sensitive obfuscation." Proceedings of the First Workshop on Cryptography and Security in Computing Systems. ACM, 2014. (Year: 2014).*

Vetillard, Eric, and Anthony Ferrari. "Combined attacks and countermeasures." International Conference on Smart Card Research and Advanced Applications. Springer, Berlin, Heidelberg, 2010. (Year: 2010).*

Preliminary Research Report received for French Application No. 1661310, dated Jul. 21, 2017, 4 pages (1 page of French Translation Cover Sheet and 3 page of original document).

Barbu et al., "New Countermeasures against Fault and Software Type Confusion Attacks on Java Cards", Naccache D., Sauveron D. (eds), Information Security Theory and Practice, Securing the Internet of Things, WISTP 2014, Lecture Notes in Computer Science, vol. 8501, 2014, pp. 57-75.

* cited by examiner

METHOD FOR PROTECTING AN ELECTRONIC DEVICE EXECUTING A PROGRAM AGAINST FAULT INJECTION AND TYPE CONFUSION ATTACKS

FIELD OF THE INVENTION

The present invention relates to a method for protecting an electronic device executing a program against fault injection and type confusion attacks executed on a variable intended to be used by the program.

PRIOR ART

As is known, a fault injection attack consists of disrupting the physical environment of an electronic device which executes a program, so as to modify the value stored by the device of a variable intended to be used by the program. Such perturbations may be produced in different ways: variation of supply voltage, variation in a clock frequency of the device, emission of electromagnetic or laser radiation, etc.

There are several types of countermeasures for protecting a variable against a fault injection attack.

A first countermeasure to protect a variable against a fault injection attack consists of simply duplicating the content of the execution stack in a backup stack. To verify the integrity of a variable, the value of the variable stored in the execution stack and the value of its copy in the backup stack are compared. If the two compared values are different, a fault is detected.

A second countermeasure, described in document EP1960934B1, consists of calculating an integrity check datum Q on the variable and storing this integrity check datum in a dedicated control stack. To apply this principle of protection, two independent stacks are allocated in the memory of the device, as shown in FIG. 1a:

- an execution stack P1 containing the value of each variable intended to be used by the program, and
- a control stack P2 containing the integrity check data Q on each variable.

Two index registers are also provided:

- a first index register ind1 containing addressing data adapted for locating the variables contained in the execution stack P1, and
- a second index register ind2 containing addressing data adapted for locating the integrity check data contained in the control stack P2.

To verify the integrity of a variable, the current value of this variable present in the execution stack is read (this value being located by way of an addressing datum associated with the variable, present in the first index register ind1), a calculating integrity is carried out on the basis of the read value and the result of this calculation is compared to the integrity datum associated with the variable which is present in the control stack (the integrity datum being located by way of a corresponding addressing datum in the second index register ind2). If the two compared values are different, a fault is detected.

However, the solution presented in document EP1960934B1 does not protect a variable against an attack called by "type confusion attack", for example carried out to attack a JavaCard program executed by a virtual machine. A type confusion attack consists of forcing a reference of a given type to an object of different type then accessing an object via a reference of invalid type to perform operations prohibited by the virtual machine, for example accessing memory beyond the limits of the object.

So, to protect variables against fault injection attacks and also type confusion attacks, it could be possible to use, according to FIG. 1b:

- three different stacks: the execution stack P1 for storing the value V of a variable, and a control stack P2 for storing an integrity check datum Q representative of the type of the variable, and a backup stack P3 for storing a copy of the value V;
- three different index registers: ind1, ind2 and ind3 containing addressing data A, A2, A3 for locating the data respectively contained in the three stacks P1, P2 and P3.

In this context, an attacker would have to modify the value V in the stack P1, the copy of this value in the stack P3, and the datum Q in the stack P2 coherently so as to succeed in his attack. But the probability of triggering such coherent modifications is low. The coherence of information contained in the three stacks P1, P2, P3 therefore offers a high level of protection of the variable.

However, the drawback of such a solution would be memory-consuming. In particular, an electronic device such as a smart card, the number of index registers utilizable simultaneously may be highly limited (for example only 8 index registers), and these index registers may prove already to be used for other purposes by such a device; the feasible solution in FIG. 1b may prove quite simply not to be possible.

DESCRIPTION OF THE INVENTION

An aim of the invention is to protect a variable stored in an execution stack against fault injection and type confusion attacks by means of reduced additional memory consumption.

According to a first aspect of the invention, a method is therefore proposed for protecting an electronic device executing a program against fault injection and type confusion attacks likely to affect a variable intended to be used by the program, the method comprising steps of:

- calculating integrity check data of the variable, the integrity check data dependent on:
  - a type of the variable, and
  - a value of the variable stored in an execution stack and/or of a first addressing datum stored in a first index register, the first addressing datum being adapted to locate the value stored in the execution stack,
- storing integrity check data on the variable in at least one control stack different to the execution stack,
- storing, in a second index register, a unique second addressing datum adapted to locate the integrity check data in the or each control stack.

The fact that the stored integrity check data depend not only on the value of the variable and/or the first addressing datum, but also on the type of the variable protects the variable against fault injection attacks but also against type confusion attacks.

Also, saving in extra memory consumption to ensure this double protection is offered by the proposed method, this saving being of a different kind according to the number of control stacks used:

In the event where the integrity check data are stored in one and the same control stack, this saving resides in the very uniqueness of this control stack in addition to the execution stack.

In the event where the integrity check data are stored in several control stacks, saving in the number of index register results. In fact, to the extent where a single addressing datum serves to locate the check data in the different control stacks used, only one extra index register is necessary.

The method according to this first aspect of the invention may further comprise the following features, taken singly or in combination when technically possible.

The calculated integrity check data may depend on or comprise:
a first integrity check datum dependent on the type of the variable,
a second integrity check datum dependent on the value of the variable and/or of the first addressing datum.

The first integrity check datum may be calculated by applying a first preset function to the value of the variable and to the addressing datum.

Applying the first preset function comprises calculation of an error control code to a datum dependent on the value of the variable and/or of the addressing datum of the variable.

The error control code is a longitudinal redundancy code.

Applying the first preset function comprises calculation of the exclusive disjunction of the value of the variable and of the addressing datum of the variable.

The second integrity check datum may be calculated by encoding the type of the variable on a number of preset bits, the number of bits being function of a total number of types of variables likely to be stored in the execution stack.

The integrity check data of variable may be or depend on the result of applying a second preset function to the first integrity check datum and to the second integrity check datum.

The second preset function may be a concatenation applied to the first integrity check datum and to at least one portion of the second integrity check datum.

As indicated previously, the integrity check data may be stored in one and the same control stack.

Alternatively,
the first integrity check datum is stored in a first control stack,
the second integrity check datum is stored in a second control stack different to the first control stack,
the unique addressing datum is adapted to locate both the first integrity check datum in the first control stack and also to locate the second integrity check datum in the second control stack.

It may further be provided that:
the first integrity check datum is stored at a first address offset from an offset relative to a reference address of the first control stack, the offset being counted in number of word in the first control stack,
the second integrity check datum is stored at a second address offset from said offset relative to a reference address of the second control stack,
the unique second addressing datum comprises, is or depends on said offset.

The second integrity check datum may be or may comprise a copy of the value of the variable.

The first integrity check datum may have a size less than or equal to the size of a word in the first control stack.

A word in the first control stack may have a size less than a word in the second control stack.

The method may further comprise verification of integrity of the variable performed when a program commands reading of the addressing datum of the variable and/or reading of the value of the variable, said verification comprising comparison between the integrity check data stored in the or each control stack and new integrity check data calculated on the basis of:
a type of the variable seen by the program during the reading command, and
the value of the variable present in the execution stack and/or of the addressing datum present in the index register during the reading command.

According to a second aspect of the invention a computer program product is also proposed comprising program code instructions for executing the steps of the method according to the first aspect of the invention, when this method is executed by at least one processor.

According to a third aspect of the invention, an electronic device such as a smart card is also proposed, comprising:
at least one processor configured to execute a program,
at least one memory adapted to contain an execution stack and at least one control stack,
wherein the processor is configured to:
calculate integrity check data of a variable stored in the execution stack, and intended to be used by the program, the integrity check data dependent on:
the type of the variable, and
the value of the variable and/or of a first addressing datum stored in a first index register, the first addressing datum being adapted to locate the variable in the execution stack,
control storage, in the or each control stack, of the integrity check data of the variable,
control storage, in a second index register, of a unique second addressing datum adapted to locate the integrity check data in the or each control stack.

DESCRIPTION OF THE FIGURES

Other features, aims and advantages of the invention will emerge from the following description which is purely illustrative and non-limiting and which must be considered in context of the appended drawings, wherein.

In all figures, similar elements bear identical reference numerals.

DETAILED DESCRIPTION OF THE INVENTION

Figure 1A:
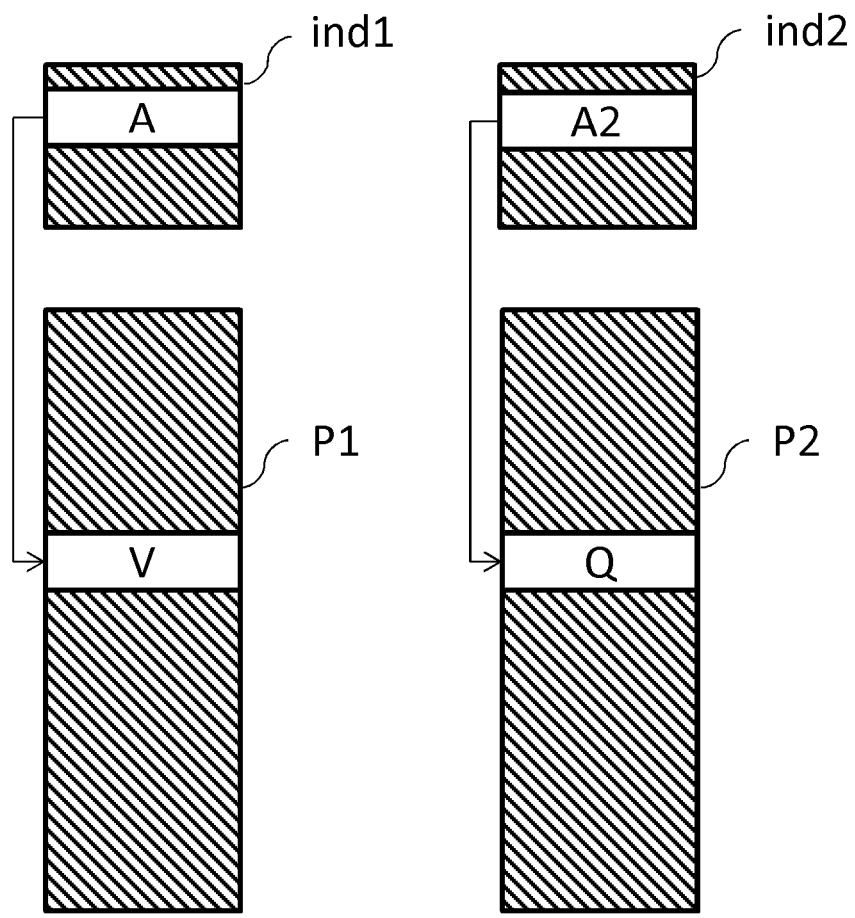
FIG. 1a, already discussed, schematically illustrates the content of a memory during execution of a method known from the prior art, protecting a variable against fault injection attacks.
Figure 1B:
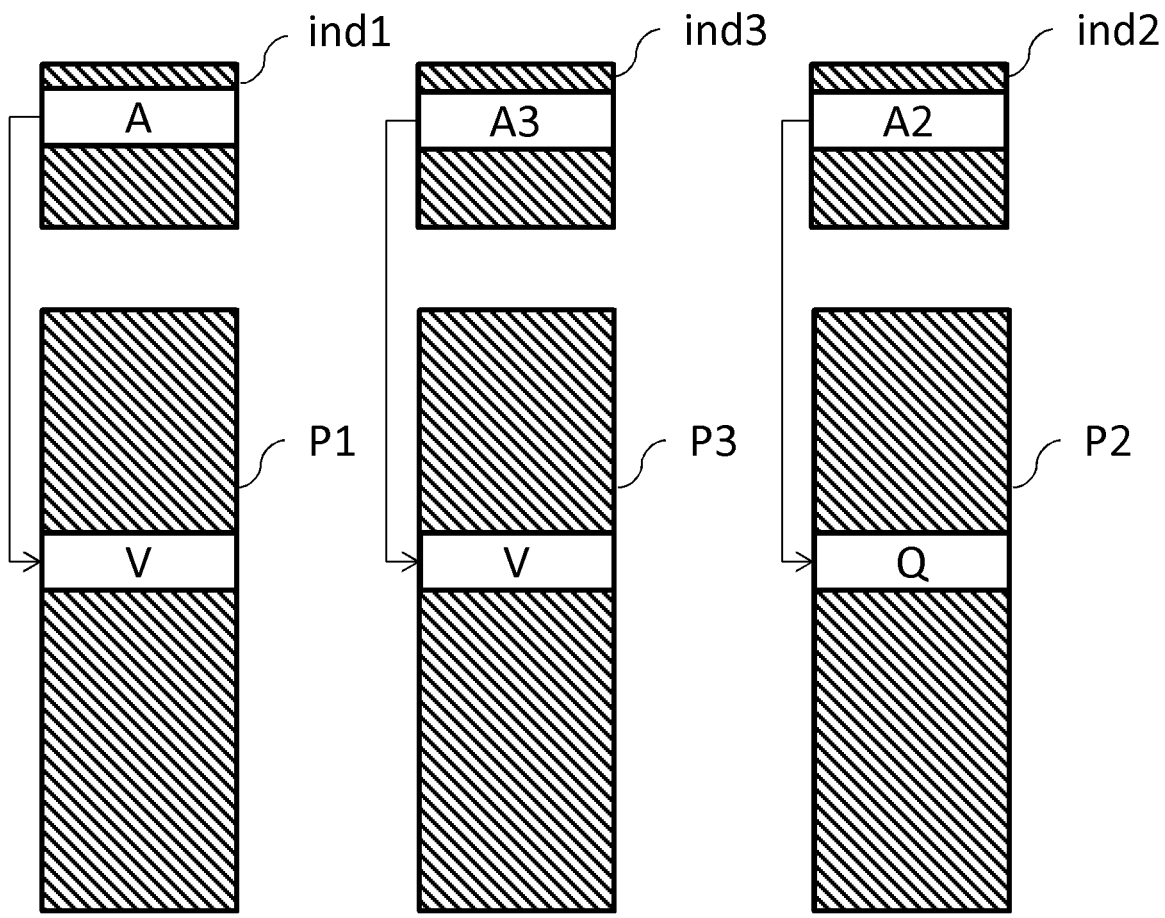
FIG. 1b, already discussed, schematically illustrates the content of a memory during execution of a method which could protect a variable against fault injection and type confusion attacks, FIG. 2 schematically illustrates an electronic device according to an embodiment of the invention, FIG. 3 schematically illustrates the content of a memory during execution of a method for protecting a variable against fault injection and type confusion attacks, according to a first embodiment of the invention.
Figure 2:
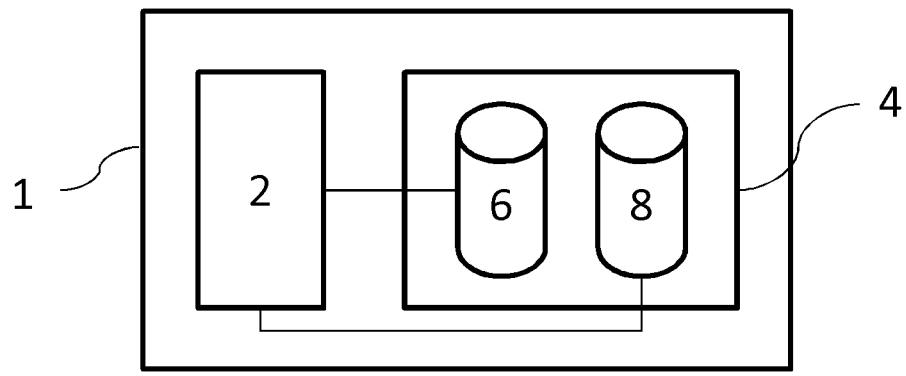

Electronic Device for Protecting Against Fault Injection and Type Confusion Attacks In reference to FIG. 2, an electronic device 1 comprises at least one processor 2 and at least one memory 4.

The memory 4 comprises at least one volatile memory 6, for example of RAM type. The function of the volatile memory 6 is to temporarily store data, for example data calculated by the processor 2. The content of the volatile memory 6 is erased when the electronic device 1 is powered down.

The memory 4 further comprises at least one non-volatile memory 8, for example of hard drive, SSD, flash, EEPROM type, etc. The function of the non-volatile memory 8 is to store data permanently, where powering down of the electronic device 1 does not erase the content of the non-volatile memory.

The processor 2 is adapted to execute program code instructions belonging to a preset set of instructions.

By extension, the processor 2 is adapted to execute a program in the form of a compiled binary comprising code instructions belonging to this preset set of instructions. The example of a program of virtual machine type will be used hereinbelow.

The virtual machine is configured to interpret a target program, the target program being in the form of a binary comprising code instructions in a format different to the above set of instructions, when the virtual machine is executed by the processor 2.

For example, a JavaCard virtual machine is configured to interpret a "bytecode" coming from a source code in the JavaCard programming language, which is an object-oriented programming language.

It is supposed hereinbelow that the virtual machine is stored in the non-volatile memory 8, along with a target program interpretable by the virtual machine.

The electronic device 1 is for example a smart card, such as a SIM card.

Method for Protecting Against Fault Injection and Type Confusion Attacks (First Embodiment)

Figure 3:
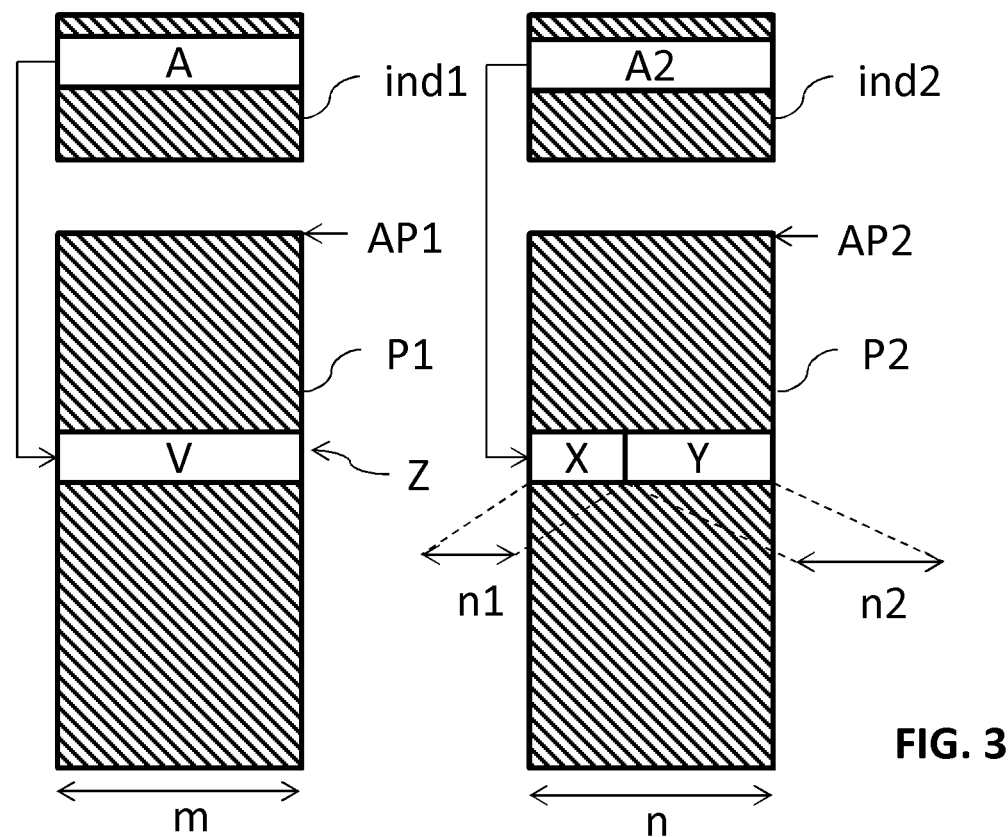
Figure 4:
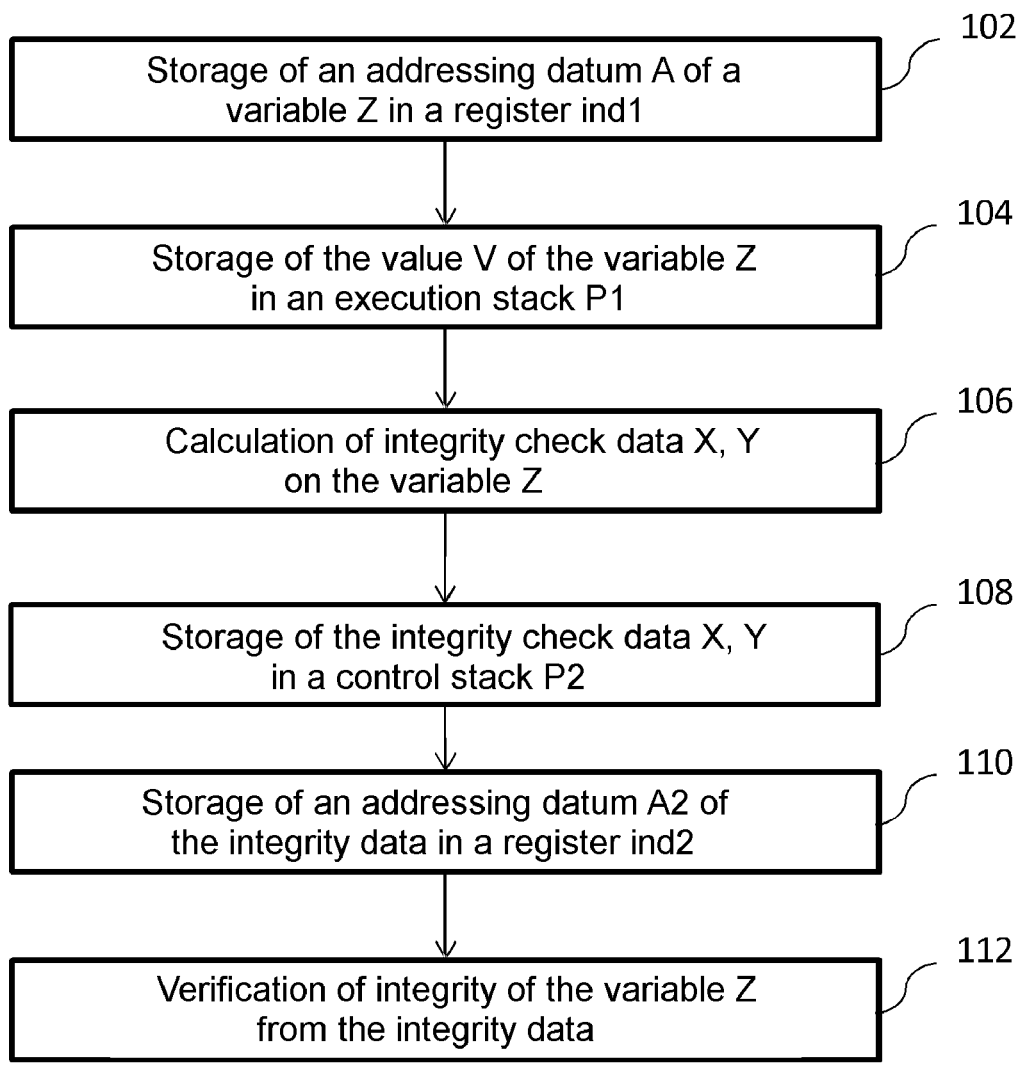
FIG. 4 is a flowchart of steps of the method according to the first embodiment of the invention, FIG. 5 schematically illustrates the content of a memory during execution of a method for protecting a variable against fault injection and type confusion attacks, according to a second embodiment of the invention

In reference to FIGS. 3 and 4, a method for protecting according to a first embodiment comprises the following steps.

The processor 2 starts execution of the virtual machine.

In the volatile memory 6 the virtual machine allocates an execution stack P1 associated with a process of the target program to be executed. The purpose of this execution stack P1 is to contain variables which the process of the target program needs during its execution by the virtual machine.

The execution stack P1 is characterized by: a stack address AP1, a stack size, and a word size m.

In the present text, it is considered that a word in a stack is a smaller unit having a unique address memory in the stack. Consequently, the size of a word is equal to the offset between two consecutive addresses in the stack.

The stack address AP1 is a start address of the stack P1, as shown in FIG. 3, or else an end address of the stack P1.

The size of the stack P1 is equal to the number of words which may be stored in the execution stack P1 multiplied by the size of one of these words. For example, if the size m of a word in the stack P1 is 32 bits and the number of words simultaneously storable in the stack P1 is 1024, the size of the execution stack P1 is 32×1024=32768 bits.

In the volatile memory 6 the virtual machine further allocates a first index register ind1 associated with the execution stack P1. The first index register ind1 is separate from the execution stack P1.

In the volatile memory 6 the virtual machine further allocates a control stack P2, separate from the execution stack P1 and the first index register ind1. As will be evident below, this control stack P2 serves to detect the presence of fault injection attacks and the presence of type confusion attacks.

In the volatile memory 6 the virtual machine also allocates a second index register ind2 associated with the control stack P2. This second index register ind2 is separate from the execution stack P1, the control stack P2 and the first index register ind1.

As the execution stack P1, the control stack P2 is characterized by: a stack address AP2 (for example a start address or end address), a stack size, and a word size n defining the size of a word storable in control stack P2.

The word size n in the control stack P2 is preferably less than the word size m in the execution stack P1, so as to limit the extra consumption memory caused by allocation of the control stack P2, in addition to the execution stack P1.

During execution of the process of the target program by the virtual machine, the virtual machine controls storage of a variable Z in the volatile memory 6.

The variable Z has a value V, an addressing datum A and a type T.

The virtual machine stores the addressing datum A in the first index register ind1, the addressing datum A being adapted to locate the value V of the variable Z in the execution stack P1 (step 102).

The virtual machine stores the value V of the variable Z in the execution stack P1, at the memory location indicated by the addressing datum A (step 104).

For example, the addressing datum A is an offset (or relative address) between the address of the execution stack P1 and the address of the variable Z, this offset being counted in number of word in the execution stack P1. Therefore, it suffices to add to (or deduct from) the address of the execution stack P1 this offset multiplied by the word size m in the execution stack P1 to obtain the address of the variable Z, and access the value V of this variable Z.

Alternatively, the addressing datum A is directly the address of the value V in the execution stack P1.

As is known per se, the type of variable defines the values which may be taken by the variable as well as the operators which may be applied to it when the latter is used by the virtual machine. By way of example, the type "char" is coded on 8 bits and a variable of this type may therefore assume 256 different values. The total number of types of variables likely to be stored in the execution stack P1 by the virtual machine is preset.

The virtual machine determines the type T of the variable Z whereof the value A and the addressing zone are stored. This determination is performed by the virtual machine by interpretation of the "bytecode".

The virtual machine calculates integrity check data on the variable Z (step 106).

These integrity check data are stored in the control stack P2 (step 108).

The virtual machine also stores a second addressing datum A2 in the second index register ind2, the second addressing datum A2 being adapted to locate the integrity check data in the control stack P2 (step 110).

The second addressing datum A2 is for example of the same format as the addressing datum A.

The second addressing datum A2 may as a variant result from applying a preset function h to the addressing datum A, according to the following formula:

$$A2=h(A)$$

The function h may be the identity function or else another function, for example a permutation.

The integrity check data depend on:
the type T of the variable, and
at least one of the value V of the variable Z and the addressing datum A of the variable Z adapted to locate the value V in the execution stack P1.

In the following, a particular embodiment is described in which the integrity check data depend on the type T of the variable Z, the value V of the variable Z, and also the addressing datum A adapted to locate the value V of the variable Z in the execution stack P1.

Calculation 106 of the integrity check data comprises the following steps.

The virtual machine calculates a datum X, representative of the type of the variable Z.

The datum X is a coding of the type of the variable Z on a number of preset bits n1, this number of bits being function of the total number k of types of variables likely to be stored in the execution stack P1.

n1 is preferably chosen, as follows:

$$n1=\lceil \log_2 k \rceil$$

where $\lceil x \rceil$ designates the ceiling of the real number x. In other words, there is:

$$\lceil x \rceil - 1 < x \le \lceil x \rceil$$

For example, if the total number of types is 4, the datum X is coded on 2 bits: the binary values 00, 01, 10 and 11 are the respective codes for the four types.

The virtual machine further calculates an integrity check datum Y by applying a preset function f to the value V of the variable Z and to the addressing datum A of the variable Z. There is therefore:

$$Y=f(V,A)$$

The integrity check data stored in the control stack P2 are or depend on the data X and Y.

For example, applying the function f comprises calculation of an error control code to an intermediary datum dependent on the value V of the variable Z and/or the addressing datum A of the variable Z, such as a longitudinal redundancy code (LRC). The intermediary datum may be the exclusive disjunction of the value V and of the address A (XOR operator).

So, in an embodiment there is:

$$Y=LRC(V \text{ XOR } A)$$

The integrity check data may be formed by a datum resulting from applying a preset function g to the data X and Y. In other words, the integrity check data are formed by the datum:

$$g(X,Y)$$

In a particular embodiment, g is a concatenation applied to the datum X (whereof the number of bits is n1) and to at least one portion of the datum Y, said portion being of length n2 in number of bits. There is:

$$g(X,Y)=X\|Y$$

where $\|$ designates the concatenation operator.

For example, the portion of Y is formed by the n2 bits of strong weight of the datum Y.

n1 and n2 are preferably selected such that n=n1+n2. If n1 is determined as a function of the total number of types of possible variables, and if it is not possible to select n, n2 is adjusted so as to verify this equality. So, the integrity check data occupy a space of minimal size in the control stack P2, and also carry a significant quantity of information.

The above steps are conducted each time the virtual machine updates the value of the variable Z in the execution stack P1.

The above steps are also conducted each time a new variable has to be stored in the volatile memory 6 (therefore especially when a new value of variable is stored at a free location of the execution stack P1).

Later, the virtual machine interprets a code instruction of the target program which controls reading of the addressing datum A of the variable Z and/or reading of the value V of the variable Z.

The virtual machine performs verification of integrity of the variable from the integrity check data X, Y stored in the control stack P2 (step 112).

The verification of integrity comprises sub-steps of:
reading the addressing datum of the variable Z present in the first index register ind1 during the reading control,
locating the value of the variable Z present in the execution stack P1 on the basis of the read addressing datum,
reading, in the execution stack P1, the value of the variable Z thus located,
determining, from said code instruction of the program, the type of the variable Z seen by the program.

The verification of integrity further comprises calculation of new integrity check data on the basis of the read data, by means of the same functions as those carried out to calculate the integrity check data X, Y previously stored in the control stack P2.

Verification of integrity further comprises steps of:
reading, in the second index register ind2, the addressing datum relative to the integrity check data on the variable, and
locating the integrity datum present in the control stack P2 on the basis of the read addressing datum A2.

Verification of integrity further comprises comparison between the new calculated integrity check data and the read integrity check data X, Y from the control stack P2.

In normal operating mode, the values A, V, T have not changed since the storage 102, 104 of the variable. Consequently, the new integrity check data and the read integrity check data from the control stack P2 are equal. In this case the virtual machine continues to execute the target program.

Different attack cases of the electronic device will now be considered.

In the event where a fault injection attack on the value V of the variable Z was made, the value V stored in the execution stack P1 has been modified to a value V'.

In the case of attack where a fault injection on the address A of the variable was performed, the value A stored in the first index register ind1 has been modified to a value A'.

In a third case of type confusion attack performed on the variable Z, the virtual machine mistakenly believes that the type of the variable stored is not T but another T' type.

In any of these three cases (or a combination of them), the new integrity check data calculated during the integrity verification step are different to the read integrity check data from the control stack P2. The virtual machine may generate an error signal, stop execution of the process of the program affected by the attacked variable, stop all the processes of the program, close down completely, or even trigger powering down or restart of the electronic device.

The proposed method protects the electronic device 1 against fault injection and type confusion attacks, without as such needing a large quantity of extra memory. In fact, a unique control stack P2 is used for storing the integrity check data X, Y for detecting both a fault injection attack and a type confusion attack.

Method for Protecting Against Fault Injection and Type Confusion Attacks (Second Embodiment)

Figure 5:
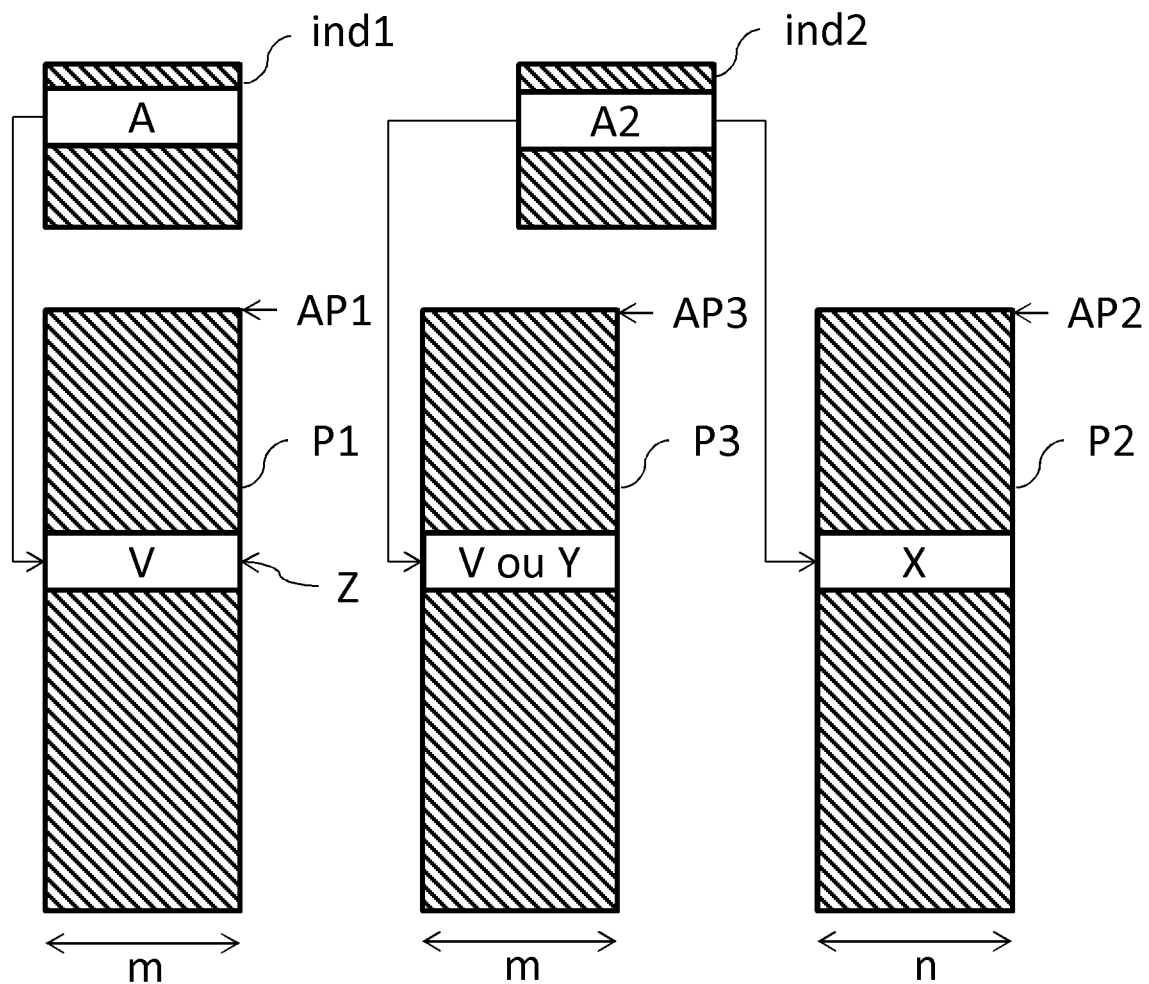
Figure 6:
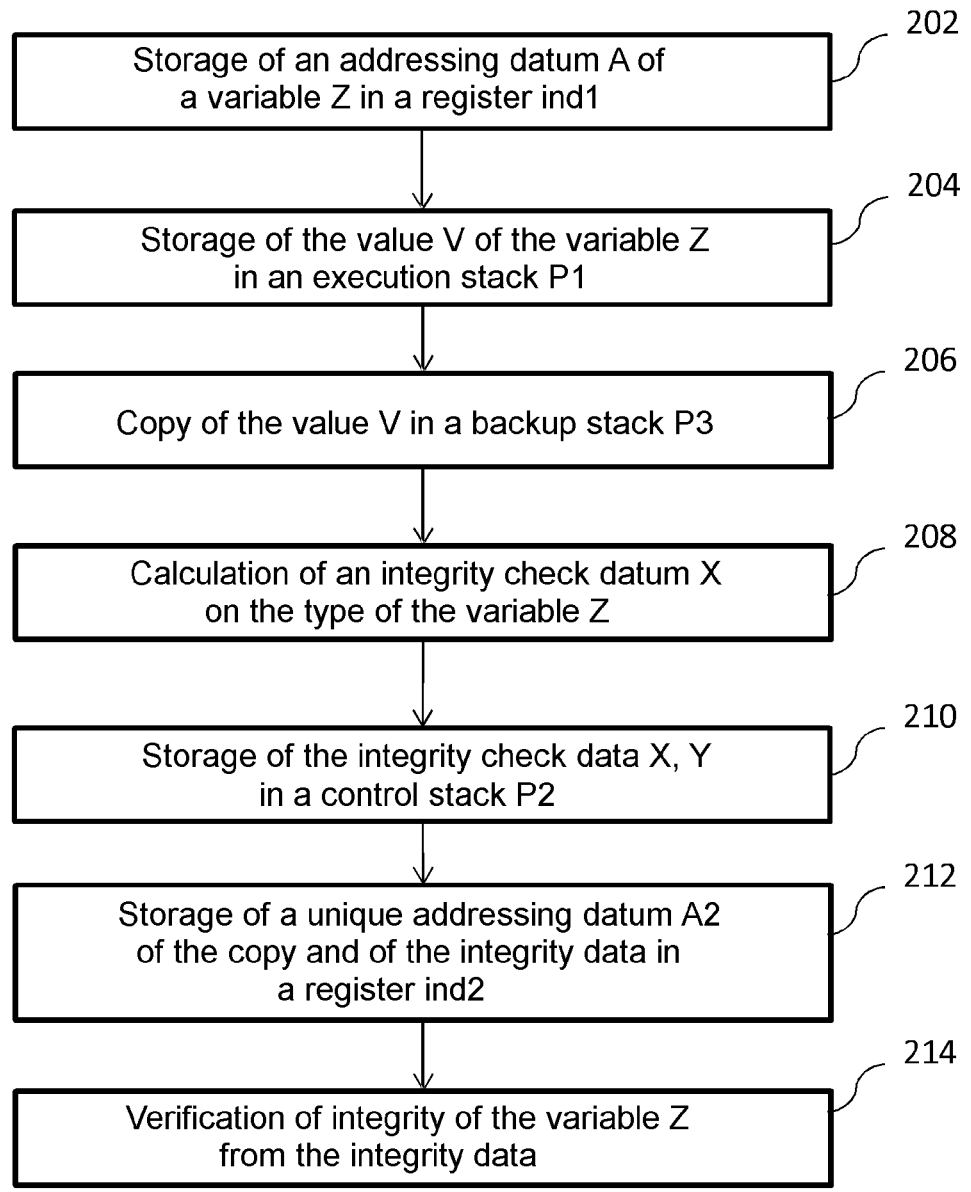
FIG. 6 is a flowchart of steps of the method according to the first embodiment of the invention.

In reference to FIG. 5, a method according to a second embodiment comprises the following steps to protect a variable Z against fault injection and type confusion attacks.

The variable Z has a value stored in an execution stack P1 identical to that of the first embodiment, and an addressing datum A stored in a first index register ind1 identical to that of the first embodiment (steps 202, 204).

In the volatile memory 6 the virtual machine allocates a control stack P2 similar to that of the first embodiment, and a control stack P3 different to the execution P1 and control P2 stacks.

In the volatile memory 6 the virtual machine also allocates a second index register ind2.

The control stack P3 is of the same size as the execution stack P1; the word size m in the stack P3 is equal to the word size in the execution stack P1.

The virtual machine stores a copy of the value V of the variable (step 206) in the control stack P3.

As a variant, in the control stack P3 the virtual machine stores an integrity check datum dependent on at least one of the value V of the variable Z and the addressing datum A of the variable Z adapted to locate the value V in the execution stack P1 (for example the datum Y previously described within the scope of the first embodiment).

Also, the virtual machine calculates and stores in the control stack P2 an integrity check datum on the type T of the variable Z (for example the datum X previously described within the scope of the first embodiment) (steps 208, 210).

In this way, unlike the method according the first embodiment wherein one single control stack stores the integrity check data, the integrity check data are distributed over several different control stacks P2 and P3 in the method according to the second embodiment.

In the index register ind2 the virtual machine also stores a unique addressing datum A2 adapted to locate both the copy of the value V in the control stack P3 and also for locating the integrity check datum on type T of the variable Z in the control stack P2 (step 212).

In other words, the two allocated supplementary stacks P2 and P3 share the same index register ind2, which saves the amount of memory used to protect the variable Z.

Later, the virtual machine interprets a code instruction of the target program which controls reading of the addressing datum A of the variable Z and/or reading of the value V of the variable Z.

The integrity of the variable Z is verified (step 214) by the virtual machine.

To verify the integrity of the variable Z, substantially the same steps as those described within the scope of the first embodiment are conducted.

The verification of integrity comprises steps of:
reading, in the first index register ind1, the addressing datum A of the variable Z,
locating the value V of the variable present in the execution stack P1 on the basis of the read addressing datum A,
reading, in the execution stack P1, the value V of the located variable,
determining the type T of the variable seen by the program.

The verification of integrity then comprises calculation of a new integrity check datum on the type, by means of the same functions as those performed to calculate the integrity check datum on the type of the variable Z, a datum which previously was stored in the control stack P2.

If an integrity datum in a form other than a copy of the value V has been stored in the control stack P3 (for example the datum Y), verification of integrity further comprises calculation of a new integrity check datum on the basis of the read data, by means of the same function as that performed to calculate the integrity check datum previously stored in the control stack P3.

Verification of integrity further comprises steps of:
reading, in the second index register ind2, the addressing datum A2 of the integrity datum associated with the variable, and
locating the integrity datum X present in the control stack P2 on the basis of the read addressing datum A2,
locating the integrity datum present in the control stack P3 on the basis of the same read addressing datum A2 (copy of the value of the variable Z, datum Y or other).

Verification of integrity further comprises:
comparison between the new calculated integrity check datum and the read integrity check data X from the control stack P3, and
comparison between the value of the variable Z present in the execution stack P1 and the read copied value from the control stack P3, or comparison between the new calculated integrity check data Y and the read check data Y from the control stack P3, according to the nature of the datum stored in the stack P3 (copy of V or datum Y).

In case of double equality, the virtual machine continues to execute the target program.

If any other case, it is considered that the variable Z has undergone an attack (fault injection or type confusion attack). In this case, the virtual machine may carry out the same processing events as those described within the scope of the first embodiment (generating an error signal, stopping execution of the method of the relevant program by the attacked variable, etc.).

It may be noted that the fact of using a copy of the value V as integrity datum accelerates the integrity verification step. In fact, there is no need to proceed with calculating integrity data to verify that the value V has not changed: it suffices to compare the values present in the stacks P1 and P3.

The addressing datum A2 stored in the index register ind2 is for example a number of words in one of the other stacks P2 and P3, said number of words being equal to:
an offset (or relative address) between an address of the copy in the first control stack and an address AP2 of the control stack P2,
an offset between an address of the integrity check data in the first control stack and an address AP3 of the control stack P3.

The addresses AP2, AP3 may be stack start addresses (as shown in FIG. 5) or stack end addresses.

As indicated previously, it suffices to add to (or deduct from) the address AP2 of the stack P2 this offset multiplied by the word size n of a word in the stack P2 to obtain the address of the datum X in the control stack P2.

Similarly, it is enough to add to (or deduct from) the address AP3 of the control stack P3 this same offset multiplied by the word size m of a word in the control stack P3 to obtain the address of the copy of the value of the variable Z stored in the control stack P3.

As a variant, the addressing datum A2 may result from applying a preset function h to the addressing datum A (for example when this addressing datum is an offset), as presented above for the first embodiment.

The integrity datum on the type is for example the datum X described within the scope of the first embodiment, of length n1. For example, n1=n is selected.

A word in the control stack P2 preferably has a size n less than the size m of a word in the control stack P3. This further reduces the extra memory consumed to protect the variable. In fact, the size of a variable Z may vary as a function of its type (i.e., the length in number of bits of the value V varies as a function of the type T of the variable Z) and even relatively big relative to the length n1.

The invention claimed is:

1. A method for protecting an electronic device executing a program against fault injection and type confusion attacks likely to affect a variable intended to be used by the program, the method being characterized in that it comprises steps of:
calculating integrity check data of the variable, wherein the integrity check data depend on:
a type of the variable, and
at least one of a value of the variable stored in an execution stack and a first addressing datum stored in a first index register, wherein the first addressing datum is adapted to locate the value stored in the execution stack,
storing the integrity check data on the variable in at least one control stack different to the execution stack,
storing, in a second index register, a unique second addressing datum adapted to locate the integrity check data in the or each control stack,
checking integrity of the variable based on the integrity check data
wherein the calculated integrity check data depend on:
a first integrity check datum dependent on the type of the variable,
a second integrity check datum dependent on the value of the variable and/or of the first addressing datum,
and wherein the integrity check data of the variable are or depend on a result of applying a preset function to the first integrity check datum and to the second integrity check datum.

2. The method according to claim 1, wherein the first integrity check datum is calculated by applying a preset function to the value of the variable and to the addressing datum.

3. The method according to claim 2, wherein applying the preset function applied to the value of the variable and to the addressing datum comprises calculating an error control code to a datum dependent on the value of the variable and/or of the addressing datum of the variable.

4. The method according to claim 3, wherein the error control code is a longitudinal redundancy code.

5. The method according to claim 2, wherein applying the preset function applied to the value of the variable and to the addressing datum comprises calculating an exclusive disjunction of the value of the variable and of the addressing datum of the variable.

6. The method according to claim 1, wherein the second integrity check datum is calculated by encoding the type of the variable on a number of preset bits, the number of bits being function of a total number of types of variables storable in the execution stack.

7. The method according to claim 1, wherein the preset function applied to the first integrity check datum and to the second integrity check datum is a concatenation applied to the first integrity check datum and to at least one portion of the second integrity check datum.

8. The method according to claim 1, wherein the integrity check data is stored in one single control stack.

9. The method according to claim 1, wherein checking integrity of the variable executed when a program commands reading of the addressing datum of the variable and/or reading of the value of the variable, said checking comprising comparison between the integrity check data stored in the or each control stack and new integrity check data calculated on the basis of:
a type of the variable seen by the program during the reading command, and
the value of the variable present in the execution stack and/or of the addressing datum present in the index register during the reading command.

10. A method for protecting an electronic device executing a program against fault injection and type confusion attacks likely to affect a variable intended to be used by the program, the method comprising:
calculating integrity check data of the variable, wherein the integrity check data depend on:
a type of the variable, and
at least one of a value of the variable stored in an execution stack and a first addressing datum stored in a first index register, wherein the first addressing datum is adapted to locate the value stored in the execution stack,
storing the integrity check data on the variable in at least one control stack different than the execution stack,
storing, in a second index register, a unique second addressing datum adapted to locate the integrity check data in the or each control stack,
checking integrity of the variable based on the integrity check data,
wherein the calculated integrity check data depend on or comprise:
a first integrity check datum dependent on the type of the variable,
a second integrity check datum dependent on the value of the variable and/or of the first addressing datum,
wherein the calculated integrity check data depend on or comprise:
a first integrity check datum dependent on the type of the variable,
a second integrity check datum dependent on the value of the variable and/or of the first addressing datum, and wherein
the first integrity check datum is stored in a first control stack,
the second integrity check datum is stored in a second control stack different to the first control stack, and
the unique second addressing datum is adapted to locate both the first integrity check datum in the first control stack and the second integrity check datum in the second control stack.

11. The method according to claim 10, wherein:
the first integrity check datum is stored at a first address offset from an offset relative to a reference address of the first control stack, the offset being counted in number of words in the first control stack,
the second integrity check datum is stored at a second address offset from said offset relative to a reference address of the second control stack, and the unique second addressing datum comprises, is or depends on said offset.

12. The method according to claim 10, wherein the second integrity check datum is or comprises a copy of the value of the variable.

13. The method according to claim 10, wherein the first integrity check datum has a size less than or equal to the size of a word in the first control stack.

14. The method according to claim 10, wherein a word in the first control stack has a size less than a word in the second control stack.

15. A non-transitory computer-readable medium comprising encoded instructions for executing the steps of the method according to claim 1, when this method is executed by at least one processor.

16. An electronic device, such as a smart card, comprising:
at least one processor configured to execute a program,
at least one memory adapted to contain an execution stack and at least one control stack,
the device being characterized in that the processor is configured to:
calculate integrity check data of a variable stored in the execution stack and intended to be used by the program, wherein the integrity check data depend on:
a type of the variable, and
at least one of a value of the variable and a first addressing datum stored in a first index register, wherein the first addressing datum is adapted to locate the variable in the execution stack,
control storage, in the or each control stack, of the integrity check data of the variable, and
control storage, in a second index register, of a unique second addressing datum adapted to locate the integrity check data in the or each control stack,
check integrity of the variable (Z) based on the integrity check data,
wherein the calculated integrity check data depend on;
a first integrity check datum dependent on the type of the variable,
a second integrity check datum dependent on the value of the variable and/or of the first addressing datum,
and wherein the integrity check data of variable (Z) are or depend on a result of applying a preset function to the first integrity check datum and to the second integrity check datum.

17. A method for protecting an electronic device executing a program against fault injection and type confusion attacks likely to affect a variable intended to be used by the program, the method being characterized in that it comprises:
calculating integrity check data of the variable, wherein the integrity check data depend on:
a type of the variable, and
at least one of a value of the variable stored in an execution stack and a first addressing datum stored in a first index register, wherein the first addressing datum is adapted to locate the value stored in the execution stack,
storing the integrity check data on the variable in at least one control stack different to the execution stack,
storing, in a second index register, a unique second addressing datum adapted to locate the integrity check data in the or each control stack,
wherein the calculated integrity check data depend on:
a first integrity check datum dependent on the type of the variable, wherein the first integrity check datum is calculated by encoding the type of the variable (Z) on a number of preset bits, the number of bits being function of a total number of types of variables storable in the execution stack,
a second integrity check datum dependent on the value of the variable and/or of the first addressing datum.

* * * * *